Sept. 21, 1926.

J. F. JOHNSON

POWER PLANT

Filed June 9, 1924

1,600,337

2 Sheets-Sheet 1

WITNESSES:

J. F. Johnson
INVENTOR

BY
ATTORNEY

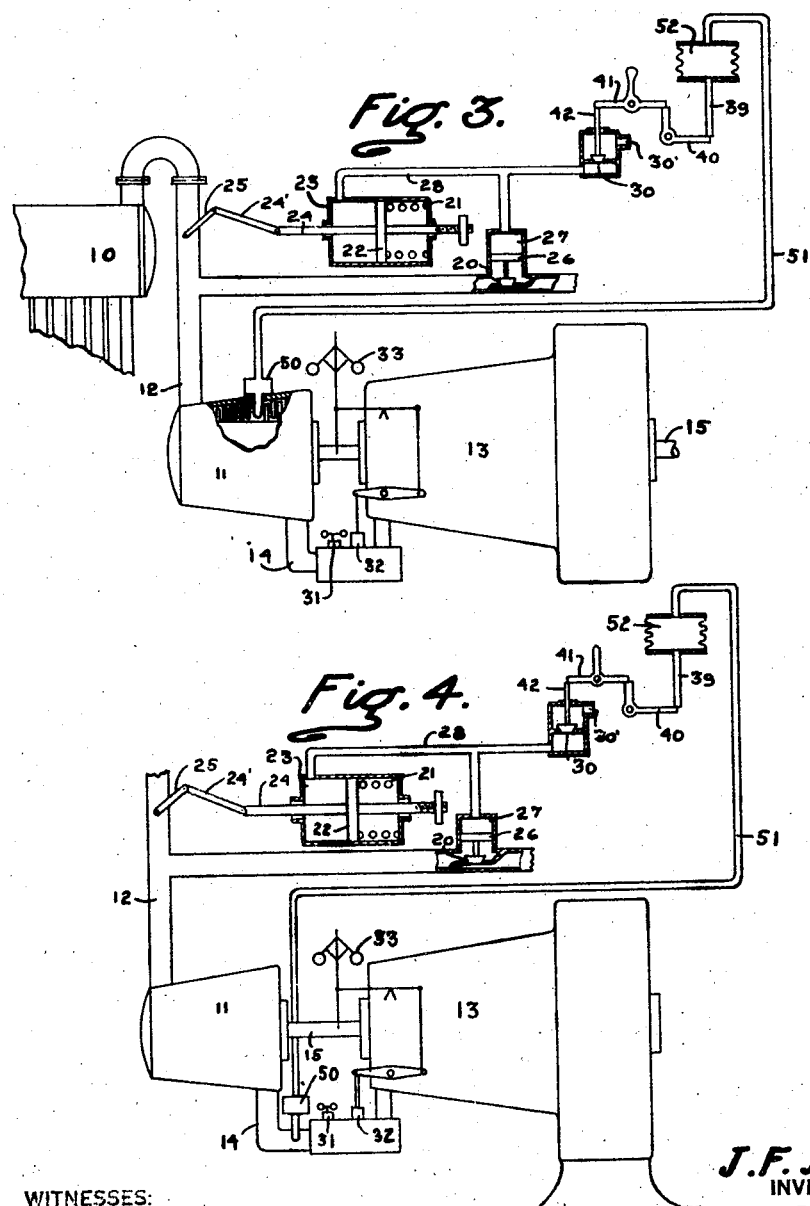

Patented Sept. 21, 1926.

1,600,337

UNITED STATES PATENT OFFICE.

JOSIAH F. JOHNSON, OF SWARTHMORE, PENNSYLVANIA, ASSIGNOR TO WESTINGHOUSE ELECTRIC & MANUFACTURING COMPANY, A CORPORATION OF PENNSYLVANIA.

POWER PLANT.

Application filed June 9, 1924. Serial No. 718,958.

This invention relates to power plants and particularly to power plants utilizing elastic fluids at extremely high pressures and high temperatures, and it has for an object to provide a construction of the character designated which shall be practical in operation and which shall obviate the necessity for using conventional fluid-controlling mechanisms, which do not operate satisfactorily and reliably in the control of the flow of elastic fluids at extremely high pressures and high temperatures, for regulating the flow of the elastic motive fluid from the generator to the power-developing apparatus.

A further object of this invention is to provide a power plant for utilizing an elastic motive fluid of higher temperatures and pressures than have been heretofore commonly used which shall provide conduit means for leading high pressure fluid direct from the generator to the power-developing apparatus without the intervention of pressure-regulating mechanism and providing means for cutting off the flow of elastic fluid to the power-developing apparatus whenever its capacity for utilizing the energy of the elastic fluid is diminished to a predetermined extent.

A further object of this invention is to provide a power plant which shall include separate power-developing sections or units, one of which shall be suitable to abstract energy from motive fluid delivered to it without reduction or regulation of the high-pressure elastic fluid from the generator, and a second section or unit operating in tandem or in parallel electrically with the first section or unit which shall utilize the elastic fluid discharged from the first section or unit at a lower temperature and pressure, and which shall provide regulating valves for the power-developing apparatus in the conduit between the power-developing sections or units thereof where the temperature and pressure of the motive fluid are suitably reduced to permit of satisfactory and reliable operation of regulating or governor controlled valves.

A still further object of this invention is to provide a cut-off valve in the elastic-fluid conduit leading from the generator which shall be responsive to a physical characteristic, such as pressure or temperature of the elastic-fluid after energy has been abstracted therefrom in the power-developing apparatus.

Figure 1:
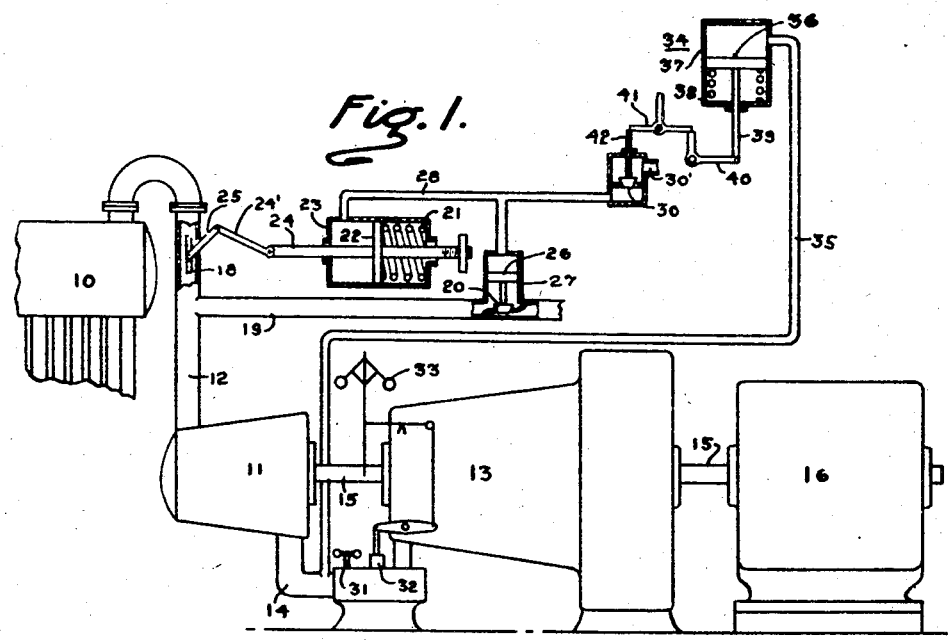
Figure 2:
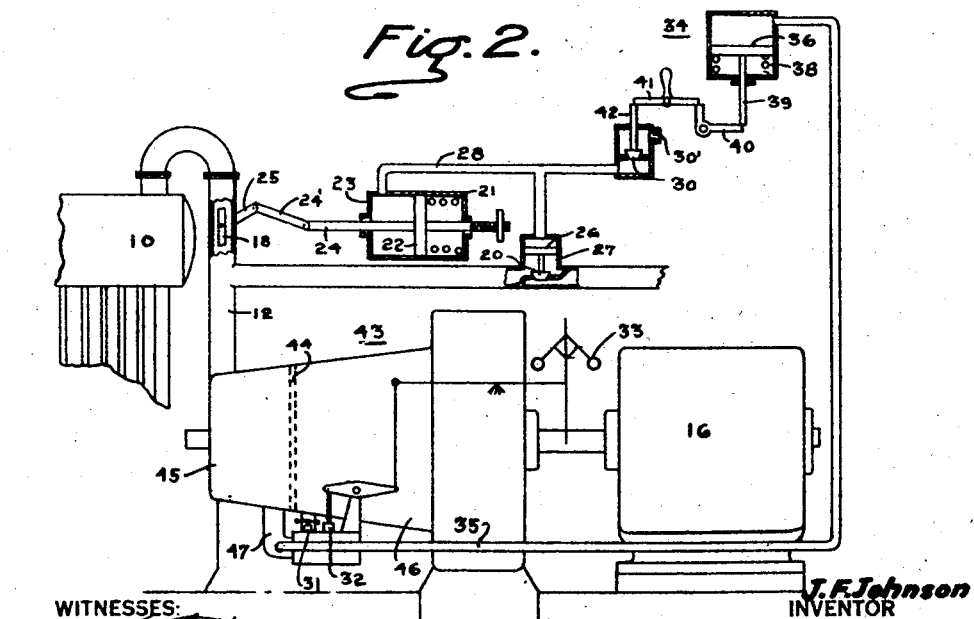

Apparatus constructed in accordance with the present invention is illustrated in the accompanying drawing, forming a part of this application, in which Fig. 1 is a diagrammatic view of power-developing apparatus embodying the present invention; Fig. 2 is a diagrammatic view showing a form of power-developing apparatus to which the invention of this application is applied; and Figs. 3 and 4 are further modifications of the cut-off valve mechanism for controlling the flow of elastic fluid from the generator.

Referring now to the drawings for a better understanding of my invention, in Fig. 1, I show means for developing elastic fluid at high pressures and high temperatures such as a steam generator or boiler 10, which is connected to a high-pressure power-developing section or unit 11 by means of a line or conduit 12. The high-pressure section or unit 11 is connected to a low-pressure section or unit 13 by means of a line or conduit 14. Preferably, the rotary elements of the power-developing sections or units 11 and 13 are carried by a common drive shaft 15 which is connected to the rotor of a generator 16.

The line or conduit 12 is provided with a freely fitting valve 18, preferably of the butterfly type, for obstructing, at times, the passage of elastic fluid therethrough. Owing to the high temperatures of elastic fluids passing through this conduit or line, it is necessary that the valve 18 shall fit the line or conduit with a considerable degree of freedom to take care of expansion and contraction and yet permit of ready operation. With the valve 18 closed, some of the elastic fluid necessarily passes by such valve; and, if it is desired that such elastic fluid shall not affect the power-developing unit or section 11, then it is necessary to relieve the conduit or line 12 between the valve 18 and the high-pressure unit or section 11. Accordingly, therefore, I show a relief conduit or passage 19 connected to the conduit or line 12 between the valve 18 and the power-developing unit 11, such relief conduit or passage being provided with a valve 20, which, when open, allows elastic fluid to pass to the atmosphere.

In normal operation, the valve 18 is opened and the valve 20 is closed and they are normally maintained in these positions by fluid pressure in a manner presently to be described.

The valve 18 tends to be moved in a closing direction by means of a spring 21 which acts against a face of a piston 22 arranged within a cylinder 23, the piston having a rod 24, connected to the link 24' which is pivotally connected to the crank arm 25 of the butterfly valve 18. The valve 18 may be moved in an opening direction by means of fluid pressure applied to the other face of the piston 22, as is more fully hereinafter described.

The valve 20 is connected to a piston 26, fitting freely within a cylinder 27, which communicates with the relief conduit 19 at the supply line or conduit side of the valve 20. With this construction, therefore, since the effective area of the upper face of the piston 26 is greater than the effective area of the lower face thereof, and since the piston 26 fits freely within the cylinder 27, elastic fluid acts upon the piston with a resultant action downward to maintain the valve 20 closed. The closed end of the cylinder 27 is connected to the end of the cylinder 23 opposite to the spring 21 by means of a conduit connection 28, so that elastic fluid under pressure which passes the piston 26 serves not only to hold the valve 20 against its seat, but also to pass through the conduit connection 28 and to enter the cylinder 23 to act upon the piston 22 and move the latter against the spring 21 to open the valve 18.

The conduit connection or line 28 is provided with a valve 30, which is normally seated but which, when opened, allows the pressure in the conduit or line 28 to drop, with the result that the spring 21 is effective to close the valve 18 and with the result that pressure of elastic fluid in the relief passage 19 is effective to move the piston 26 so as to open the valve 20, whereby, when the valve 18 is closed, with the necessary and incidental leakage of elastic fluid thereby, the valve 20 is opened to relieve such fluid as leaks by in order to prevent its acting upon the high-pressure section or unit 11.

The conduit or line 14 for connecting the high-pressure section or unit to the low-pressure section or unit, is provided with a throttle valve 31 and with governor-controlled primary valve 32, responsive to a speed governor 33 of any suitable type. As already mentioned, the temperature and pressure of the elastic fluid are so reduced in the high-pressure section 11 that valves of this character may be satisfactorily and reliably used in the line or conduit 14.

A pressure-responsive device 34 is connected to the conduit or line 14 between the high-pressure section or unit 11 and the valves 31 and 32 by means of a suitable conduit 35. Whenever the throttle valve 31 or governor valve 32 is closed, pressure builds up in the conduit or line 14 between such valves and the high-pressure section or unit 11, and when such pressure reaches a predetermined value, the pressure-responsive device, at 34, operates to allow the valve 30 to open to relieve pressure in the conduit connection 28, with the result that the butterfly valve 18 is closed and the pressure relief valve 20 is opened.

The pressure-responsive device 34 as illustrated, comprises a piston or abutment 36 arranged within a cylinder 37, which is connected to the conduit or line 35 so that fluid under pressure is admitted to the cylinder to act upon one face of the piston 36. The cylinder 37 contains a spring 38, which acts upon the other face of the piston 36 in opposition to the fluid pressure applied thereto. The piston 36 is provided with a rod or stem 39, which, when the piston 36 is moved sufficiently by fluid pressure, is adapted to tilt a lever 40 in order to trip the holding lever 41, which normally cooperates with the stem 42 of the valve 30 to maintain the latter closed. With this apparatus, whenever the pressure of fluid in the conduit or line 14 exceeds the force of the spring 38 to a predetermined extent, the piston 36 moves to trip the lever 41, with the result that the valve 30 moves upwardly due to the pressure of fluid effective against the face thereof which is exposed to the exterior of the conduit 28 and pressure fluid passes through the vent 30' to relieve pressure in the conduit 28 for purposes already referred to.

From the structure described, it will be apparent, therefore, that whenever the flow of elastic fluid through the conduit or line 14 is interfered with, as by closure of the throttle valve 31, pressure builds up in such conduit or line between the high-pressure section or unit 11 and the throttle valve; and, when such pressure reaches a predetermined value, the pressure-responsive device, at 34, is effective to trip the lever 41, with the result that the valve 30 is then free to move to relieve the pressure in the conduit 28, whereupon the spring 21 is effective to close the valve 18 and the pressure at the valve side of the piston 26 is effective to open the valve 20, whereby the flow of elastic fluid in the conduit or line 12 is obstructed as much as practicable and such fluid which necessarily escapes by the valve 18 passes to the atmosphere so as not to act upon the high-pressure section or unit 11.

The sections or units 11 and 13 are preferably turbines, the section or unit 11 being relatively small and specially designed to take care of motive fluid at high pressures and high temperatures, while the low-pressure section or unit 13 may be a turbine of conventional or standard design. For example, elastic fluid may enter the high-pressure section or unit 11 at 1200 pounds per square inch pressure and at a temperature of 850° F. and be expanded so that it is discharged, for example, at 300 pounds pressure and 600° F. The latter temperature is sufficiently low to permit of satisfactory and reliable throttle and governor valves being used.

In Fig. 2, I show a modified form of power-developing or turbine apparatus in which, instead of using a tandem arrangement of turbine sections, as is done in Fig. 1, the turbine sections are mounted in a single casing. In this view, I show power-developing apparatus including a casing 43 provided with an interior partition or diaphragm 44, which divides the power-developing apparatus into a high-pressure unit or section 45 and a low-pressure unit or section 46. Elastic fluid is supplied to the high-pressure section or unit 45 by means of a conduit or line 12, as heretofore described. After being expanded in the high-pressure section or unit 45, elastic fluid enters the passageway 47, which contains a throttle valve 31 and governor-controlled valve 32, as heretofore described. A conduit 35 communicates with the passageway 47 between the high-pressure section 45 and the valves 31 and 32, and it is effective in the manner heretofore referred to, to secure movement of the butterfly valve 18 to a closed position and movement of the pressure relief valve 20 to an open position whenever the throttle valve 31 is closed. The arrangement shown in Fig. 2 differs from that shown in Fig. 1 therefore, merely in the type of power-developing apparatus employed.

Instead of depending upon an excessive pressure between the high-pressure unit or section and the throttle valve 31, as in Fig. 1, to secure closure of the valve 18 and relief of pressure between the latter valve and the high-pressure unit or section, thermostatic means may be used for this purpose. In Fig. 3, I show a thermostat 50 arranged within the high-pressure unit or section and connected to an expansible or sylphon element 52 through a conduit 51, which serves to trip the lever 40 upon the attainment of a predetermined temperature at the position of the thermostat for any cause, such as closure of the throttle valve 31 and resultant increase in temperature.

Fig. 4 shows apparatus which is similar in principle to Fig. 3, the only difference being that the thermostat 50′, instead of being placed between stages of the high-pressure unit 11, is arranged in the passageway between the exhaust of the high-pressure unit 11 and the throttle valve 31. It will be obvious that the thermostatic arrangement might be used with a turbine of the type shown in Fig. 2 and that its location might be at any suitable or desirable point.

From the apparatus described it is apparent that I have devised a power plant which is capable of utilizing elastic fluids at high temperatures and in which the throttle and governor-controlled valves are located in the line between power-developing sections so that they will be submitted to more moderate temperatures and pressures of elastic fluid. In view of the extreme conditions of temperature and pressure existing in the conduit or line 12, the valve 18 must necessarily be of the freely fitting type with the result that, when it is closed, there is more or less leakage of elastic fluid thereby; and, it is accordingly necessary to relieve this pressure. I, therefore, show apparatus for assuring closure of the valve 18 and opening of the valve 20 whenever the pressure or the temperature at any suitable point in the power-developing apparatus exceeds a predetermined value.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a power plant, the combination of an elastic-fluid generator, a power-developing unit, a conduit between the generator and the power-developing unit for supplying to the latter elastic fluid at high temperatures and pressures, atmospheric relief means associated with the conduit, and means responsive to a physical characteristic of elastic fluid after it has done work in the power-developing unit for rendering said atmospheric relief means operative.

2. In a power plant, the combination of an elastic-fluid generator, a power-developing unit, a conduit between the generator and the power-developing unit, atmospheric relief means associated with the conduit, and means responsive to a physical characteristic of elastic fluid after it has done work in the power-developing unit for rendering said atmospheric relief means operative.

3. In a power plant, the combination of an elastic-fluid generator, a power-developing unit, a conduit between the generator and the power-developing unit, a valve in the conduit, atmospheric relief means associated with the conduit between the valve and the power-developing unit, and means responsive to pressure of elastic fluid after it has done work in the power-developing unit for operating said valve and said atmospheric relief means.

4. In a power plant, the combination of an elastic-fluid generator, a power-developing unit, a conduit between the generator and the power-developing unit, a freely-fitting butterfly valve in the conduit, atmospheric relief means connected to the conduit between the butterfly valve and the power-developing unit and including a valve and a differential piston connected to the valve which is normally subject to the pressure of elastic fluid which passes said piston to urge the butterfly valve to an open position, and means responsive to pressure of elastic fluid which has done work in said power-developing unit to relieve pressure effective on the butterfly operating means and on the atmospheric relief valve piston, whereby the butterfly valve may be moved in a closing direction and the atmospheric valve opened.

5. In a power plant, the combination of an elastic-fluid generator, a high-pressure section, a conduit for connecting the generator to the high-pressure section, a low-pressure section, a conduit for connecting the high-pressure section to the low-pressure section, atmospheric relief means associated with the first conduit, a controlling valve in the second conduit to control the passage of elastic fluid to the low-pressure section and pressure-responsive means connected to the second conduit between the high-pressure section and the controlling valve for opening the atmospheric relief means upon the attainment of a predetermined pressure in the second conduit.

6. In a power plant, the combination of an elastic-fluid generator, a high-pressure power-developing section, an elastic-fluid passage between the generator and the high-pressure section, a freely-fitting butterfly valve in the passage, atmospheric relief means associated with the passage between the butterfly valve and the high-pressure section, a low-pressure section, a passage for connecting the high and low-pressure sections, valve mechanism in said passage, and pressure-responsive means connected to the second passage for closing said butterfly valve and for opening said atmospheric relief means upon the attainment of a predetermined pressure in the second passage.

7. In a power plant, the combination of a steam generator, high and low-pressure turbine sections, a passage for connecting the generator with the high-pressure section, a butterfly valve in the passage, atmospheric relief means associated with the passage between the butterfly valve and the high-pressure section, a passage for connecting the high and low-pressure sections, throttle and governor-controlled valve mechanism in the second passage, and means operative upon the attainment of a predetermined pressure in the second passage between the high-pressure section and the said valve mechanism to close the butterfly valve in the first passage and to open the atmospheric relief means.

8. In a power plant, the combination of means for obtaining elastic fluid at high temperatures and pressures, a high-pressure power-developing unit, a passage for connecting said means to said unit, a freely-fitting valve in the passage, atmospheric relief means associated with the passage between the freely-fitting valve and the high-pressure unit, pressure-actuated devices for maintaining the freely-fitting valve open and the atmospheric relief means closed, a low-pressure power-developing unit, a passage for connecting the units, controlling valve mechanism in the latter passage, and pressure-responsive means connected to the latter passage between the high-pressure unit and the controlling valve mechanism for relieving pressure on said pressure-actuated devices upon the attainment of a predetermined pressure in said latter passage.

9. In a power plant, the combination of a steam generator, a first power-developing section, a passage for connecting the generator to said section, a freely-fitting valve in the passage, an atmospheric relief means associated with the passage between the freely-fitting valve and said first section, pressure-actuated devices for maintaining the freely-fitting valve open and the atmospheric relief means closed, a second power-developing section, a passage for connecting the sections, controlling valve mechanism in the latter passage, and pressure-responsive means connected to the latter passage between the first section and the controlling valve mechanism for relieving pressure on said pressure-actuated devices upon the attainment of a predetermined pressure in said latter passage, whereby the freely-fitting valve may be closed and the atmospheric relief means may be opened.

10. In a power plant, the combination of a steam generator of the high-pressure and high-temperature type, a first power-developing section, a passage for connecting the generator to said section, a freely-fitting valve in said passage, an atmospheric relief passage connected to said passage between the freely-fitting valve and said section, a valve in the relief passage, a differential piston connected to the latter valve and exposed to the pressure of steam in said supply passage, a movable abutment for opening and closing said freely-fitting valve, biasing means cooperating with one side of said abutment to close the freely-fitting valve, a passage for conducting steam which leaks by the differential piston to act on the other face of said abutment to open the freely-fitting valve, a valve for relieving pressure in the relief passage and capable of being opened by the pressure therein, means for holding the latter valve closed, a second power-developing section, a passageway for connecting the sections, valve mechanism in the passageway to control the admission of steam to the second section, and pressure-responsive means connected to said passageway between the first section and said valve mechanism and operative upon the attainment of a predetermined pressure to release said valve-holding means, whereby said freeely-fitting valve may be closed and said atmospheric relief passage may be opened.

11. In a power plant, the combination of a steam generator of the high-pressure and high-temperature type, a first-power-developing section, a conduit for connecting the generator to said section, a freely-fitting butterfly valve in said conduit, an atmospheric relief passage connected to the conduit between the butterfly valve and said section, a valve in said passage, a cylinder communicating with the passage at the conduit side of the latter valve, a differential piston in the cylinder and connected to the relief valve, a piston for operating the butterfly valve, a cylinder for the latter piston, a conduit for connecting the cylinders, means for relieving pressure in the latter conduit, means for holding the latter means normally closed, a second power-developing section, a passageway for connecting the sections, valve mechanism in the passageway, and pressure-responsive means associated with the passageway between the first section and the valve mechanism and operating upon the attainment of a predetermined pressure to release said valve-holding means.

12. In a power plant, the combination of a steam generator of the high-pressure and high-temperature type, first and second power-developing sections, a conduit for connecting the generator to the first section, a conduit for connecting the first and second sections, a butterfly valve in the first conduit, atmospheric relief means associated with the first conduit between the butterfly valve and the first section, means for normally biasing the butterfly valve to a closed position, pressure-actuated devices for closing the butterfly valve and for opening the relief valve, and pressure-responsive means associated with the second conduit between the first section and said valve mechanism and effective upon the attainment of a predetermined pressure to relieve the pressure upon said actuated devices, whereby the butterfly valve may be closed and the relief valve may be opened.

13. In a power plant, the combination of a steam generator, a first power-developing section, a conduit for connecting the generator to said section, a butterfly valve in the conduit, a pressure-relief valve for the conduit between the butterfly valve and said section, movable abutments connected to the valves, means for exerting pressure on the abutments to close the butterfly valve and to open the relief valve, means for exerting pressure on the abutments to open the butterfly valve and to close the relief valve, a second power-developing section, a conduit for connecting the sections, controlling valve mechanism in the latter conduit, and pressure-responsive means connected to the latter conduit between the first section and the valve mechanism and effective upon the attainment of a predetermined pressure to relieve the pressure of said second pressure-exerting means, whereby the butterfly valve is closed and the pressure relief valve is opened under the influence of said first pressure-exerting means.

In testimony whereof, I have hereunto subscribed my name this fourth day of June, 1924.

JOSIAH F. JOHNSON.